Jan. 14, 1958
G. D. FULTZ
FISHING LURE
Filed Jan. 18, 1955
2,819,553
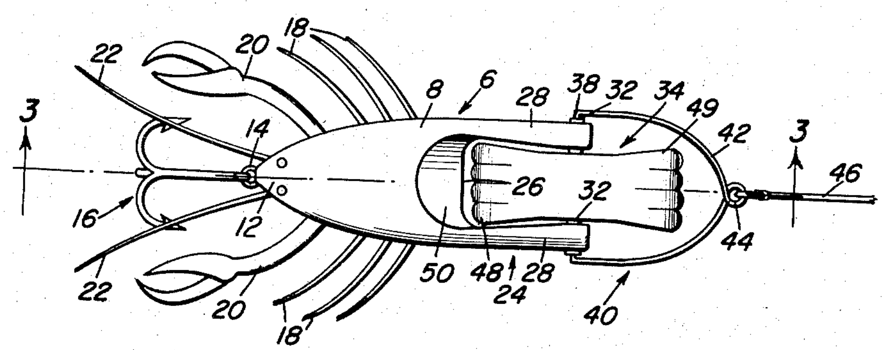
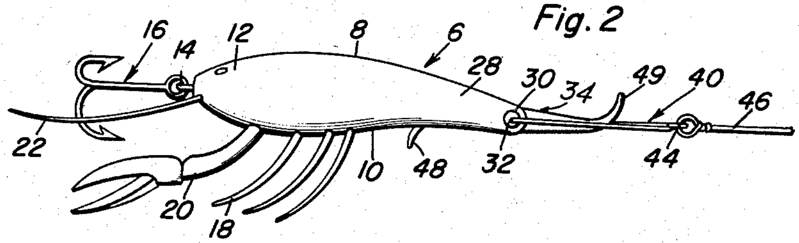
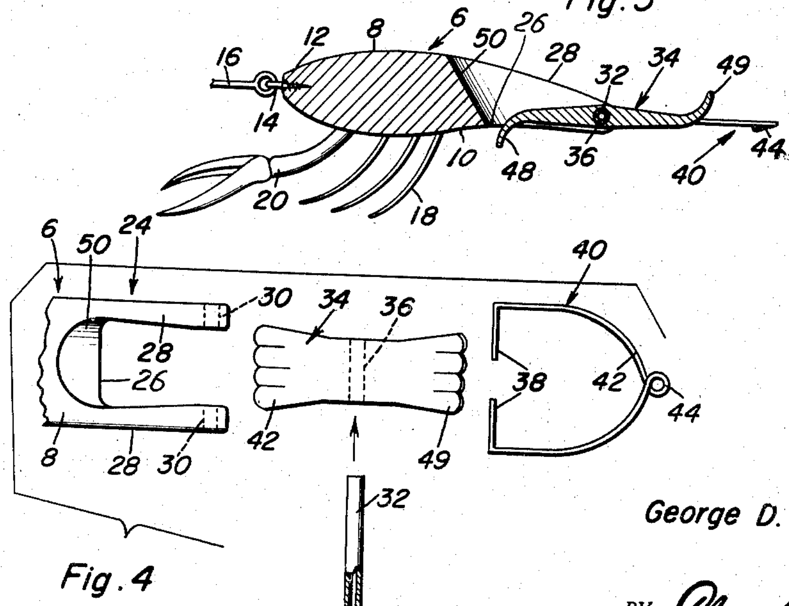
George D. Fultz
INVENTOR.
BY Clarence A. O'Brien and Harvey B. Jacobson
Attorneys 2,819,553

FISHING LURE

George D. Fultz, Compton, Calif.

Application January 18, 1955, Serial No. 482,486
2 Claims. (Cl. 43—42.12)

This invention relates to a fish lure which is expressly, but not necessarily, constructed and designed to simulate a crustacean, a crayfish, for example, and which is novel in that it imitates a live crayfish in the act of swimming.

More specifically, the invention has to do with an imitation crayfish which is constructed for animated action in that when it is pulled through a body of water with the usual fishing line it receives its swimming motion from a revolving bladed spinner which is embodied therein in a novel manner.

A preferred embodiment of the invention comprises an elongated body constructed to represent a crustacean, a crayfish for example, one end of said body being forked and thus embodying a pair of spaced prongs and a crotch at the inner body-attached ends of said prongs, a spinner mounted for free rotation between the free outer ends of said prongs and adapted to rotate as the lure is pulled by the usual fishing line through a body of water, a bail hingedly attached to said outer ends to accommodate said fishing line, and a fishhook secured to the other end of said body.

Equally important is the fact that the crotch portion of the stated fork embodies an inclined surface or declivity slanting downwardly and forwardly from the dorsal to the ventral surface of said elongated body.

Other objects, features and advantages will become more readily apparent from the following description and the accompanying sheet of illustrative drawings.

In the drawings:

Figure 1 is a top plan view of the improved imitation crayfish.

Figure 2 is a side elevational view of the same;

Figure 3 is a central longitudinal sectional view, with portions appearing in elevation, taken on the line 3—3 of Figure 1; and, Figure 4 is an exploded view illustrating some of the structural details.

Referring now to the drawings and with respect to Figures 1 to 4 inclusive, the elongated wooden, plastic, or equivalent body is denoted by the numeral 6. It is of a suitable size and external appearance so that it represents a lobster-like creature or crustacean which is here conveniently referred to as a crayfish. The dorsal surface is denoted at 8 and the ventral surface at 10 and one tapered end portion is denoted at 12. At this end there is an eye screw 14 carrying a conventional fishhook 16. This may be treated as the rearward or trailing end. Also provided here are suitable flexible and vibratory feelers 18 of rubber or the like and flexibly resilient imitation claws 20. Also, if desired, flexible elements may be provided to extend in rearward divergent relationship and to function as antenna complements 22. The other or leading end is bifurcated to provide a fork 24 embodying a bight or crotch portion 26 and duplicate companion furcations or prongs 28. The free outer ends of the prongs are provided with transverse passages defining suitable sockets 30 for the end portions of a tubular open ended axle 32. This spans the space between the free ends of the prongs and serves as a mount for the bladed rotor or spinner 34. The spinner, as shown in Figure 4 has a centrally located transverse passage or bore 36 providing a suitable hub portion which is mounted and rotates freely on the axle between the prongs. The open end portions of the tubular axle provide socket-like bearings for laterally directed free end portions 38 on the axial retaining arms of a U-shaped wire or equivalent bail 40. These bent ends provide journals which are rotatable in the socket-ends of the axle 32 in an obvious manner. The bight portion 42 is fashioned into a coil-like bend 44 providing an eye to which the fishing line 46 may be connected to draw or drag the device through a body of water. In the form of the invention shown the rotor is provided with two substantially coplanar blades with their free ends laterally bent or curved in opposite directions as denoted at 48 and 49. When the bail or yoke 40 is substantially coplanar with the fork, the overall length of the spinner is such that it turns within the space defined by the combined fork and bail. Of importance, as before touched upon, is the inclined surface or declivity 50. This cooperates with the crotch portion 26 and is preferably formed in the dorsal or top side and slants downwardly in the direction of the forked prongs and attached bail. The declivity tends to keep the forward portion of the lure submerged so that the blades of the rotor will rotate when the lure is drawn through the water.

One or more fishhooks may be used. The legs and feelers will be made of rubber in one piece and then, if desired, suitably attached to the cooperating end portion of the body.

Minor changes in shape, size, materials and rearrangement of elements which do not depart from the spirit of the invention or scope of the invention, as claimed, may be resorted to in actual practice, if desired.

What is claimed as new is as follows:

1. A fishing lure comprising an elongated body constructed to represent a crayfish, the leading end of said body being bifurcated and thus defining a fork embodying a pair of spaced parallel coplanar furcations having free outer ends and an intervening portion between the inner body-attached-ends of said furcations, said furcations having outer free end portions provided with oppositely disposed axially aligned transverse bores, said body having dorsal and ventral surfaces, said crotch portion having an inclined surface sloping downwardly and forwardly from the dorsal surface to the ventral surface, a tubular axle spanning the space between the free outer ends of said furcations and having open end portions fitting into their respective bores and providing sockets, a substantially U-shaped bail having a bight portion and arms, the free ends of said arms straddling the free outer ends of said furcations and being provided with laterally directed terminal ends constituting journals, said journals being telescopically and hingedly fitted into said sockets, and a bladed spinner having a central hub portion mounted for rotation on said axle between said furcations, the tip ends of the blades of said spinner operating in a path adjacent to but clear of the lower end portion of said inclined surface.

2. A fishing lure comprising an elongated body constructed to represent a crayfish, said body having dorsal and ventral surfaces, the leading end of said body being bifurcated and defining a fork embodying a pair of spaced parallel coplanar furcations having free outer ends and an intervening crotch portion between the inner body-attached ends of said furcations, a hollow rigid axle spanning the space between said furcations and having its respective end portions mounted in the respective forward end portions of said furcations, a U-shaped wire bail having axle retaining arms, the end portions of said arms straddling said furcations and being hingedly and detachably positioned in the respective ends of said hollow axle, the bight portion of said bail serving to accommodate an attachable fishing line and being normally spaced a predetermined distance from the forward end of said furcations, a bladed spinner mounted for free rotation at its central portion on said axle between said furcations, said crotch portion having an inclined surface sloping downwardly and forwardly from the dorsal surface to the ventral surface of said body, and the tip ends of the blades of said spinner operating in a path of rotation adjacent to but clear of the lower end portion of said inclined surface and also clear of the bight portion of said bail.

References Cited in the file of this patent

UNITED STATES PATENTS

| | | |
|---|---|---|
| D. 62,518 | Clark | June 12, 1923 |
| 552,012 | Stanley | Dec. 24, 1895 |
| 879,869 | Hansen | Feb. 25, 1908 |
| 1,521,090 | Goble | Dec. 30, 1924 |
| 2,218,280 | Deering | Oct. 15, 1940 |
| 2,230,919 | Wick | Feb. 4, 1941 |
| 2,341,234 | O'Byrne | Feb. 8, 1944 |
| 2,347,609 | Phillips | Apr. 25, 1944 |
| 2,517,495 | Kneece | Aug. 1, 1950 |